May 7, 1940.  A. WIRTH  2,200,141
BEARINGS, ESPECIALLY FOR WEIGHING MACHINES
Filed Feb. 12, 1938   3 Sheets-Sheet 1
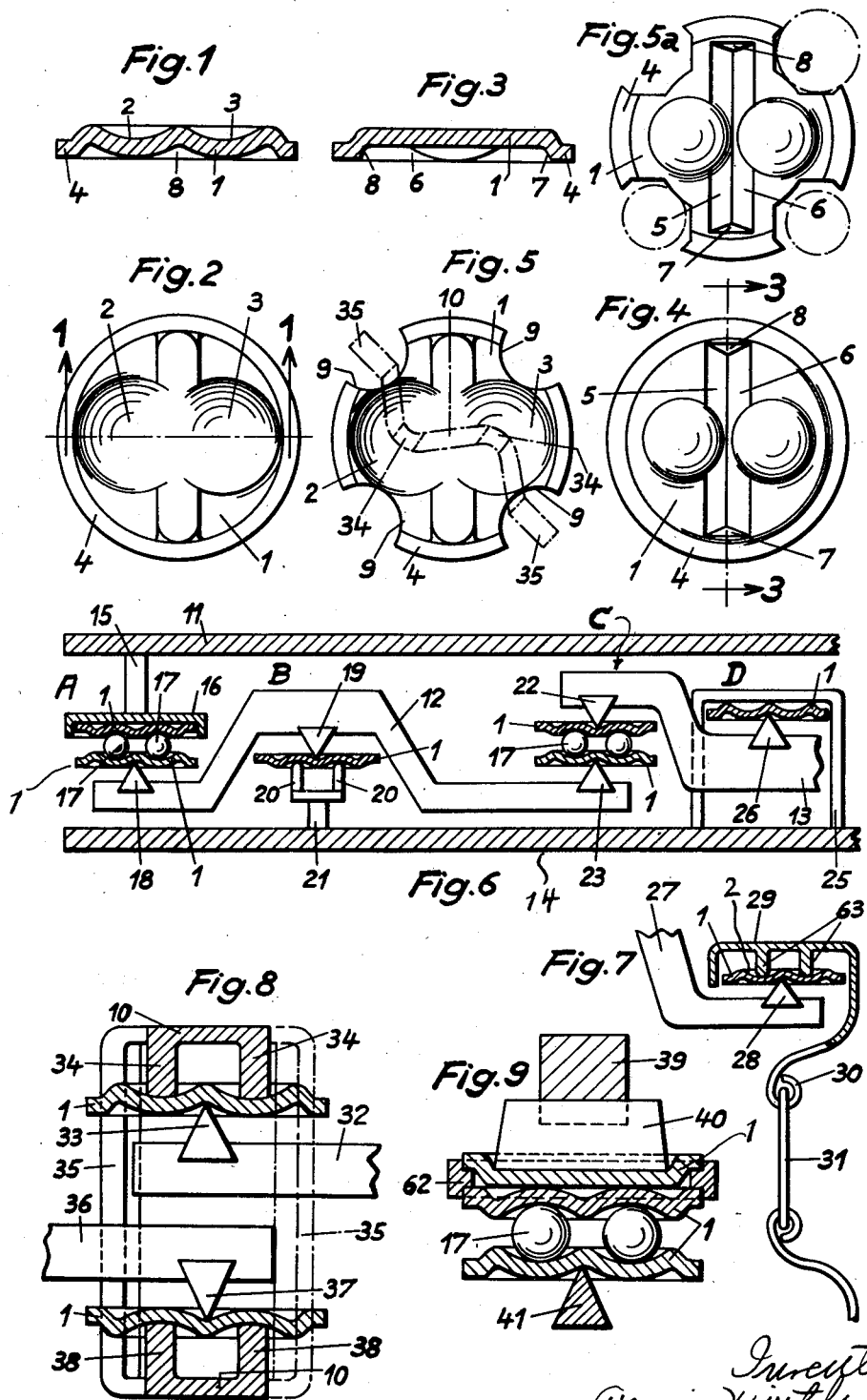

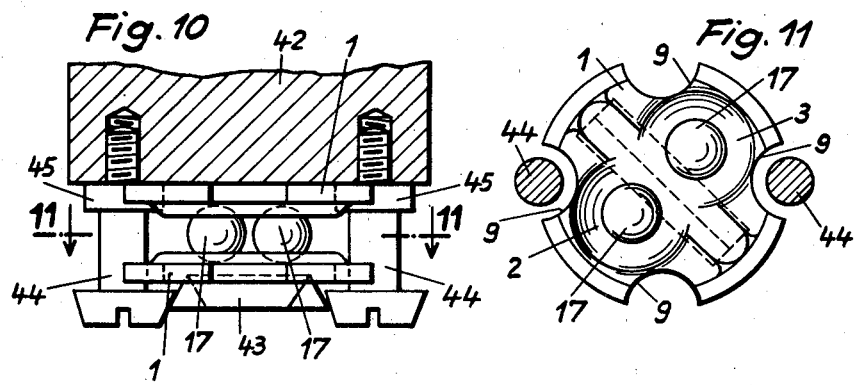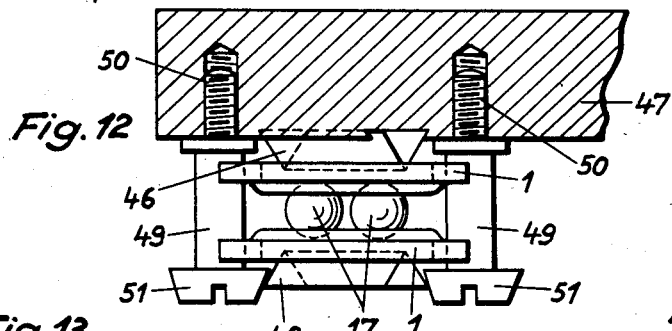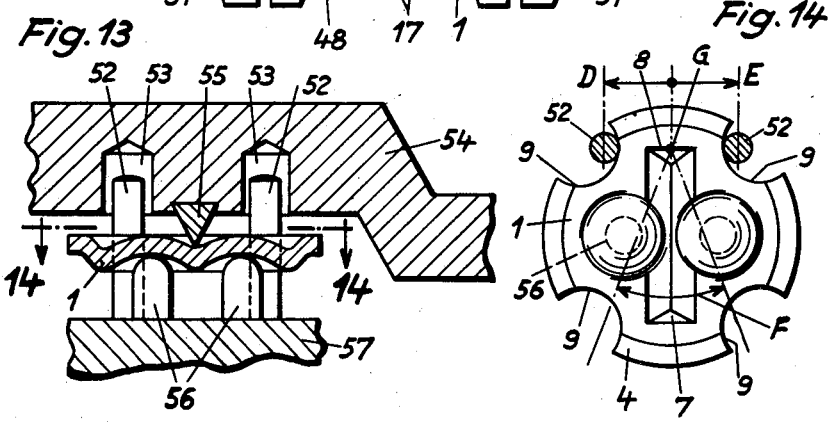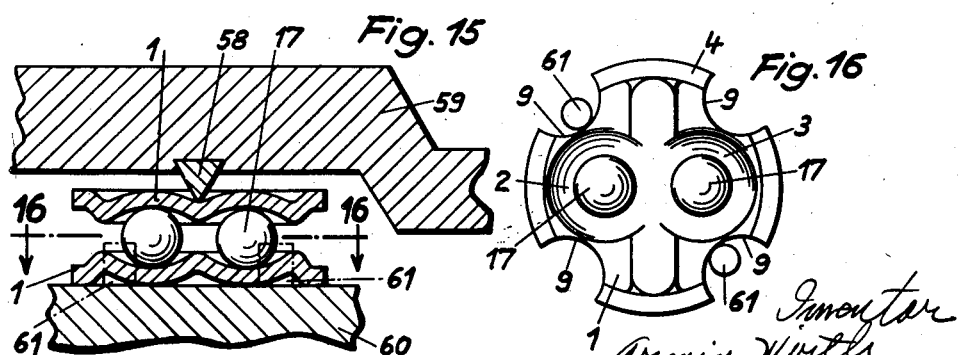

May 7, 1940. A. WIRTH 2,200,141
BEARINGS, ESPECIALLY FOR WEIGHING MACHINES
Filed Feb. 12, 1938 3 Sheets-Sheet 3
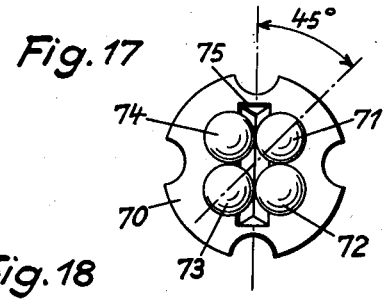
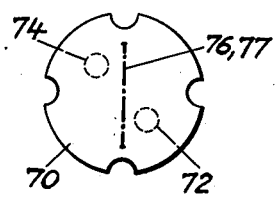
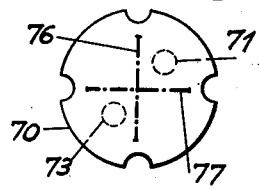
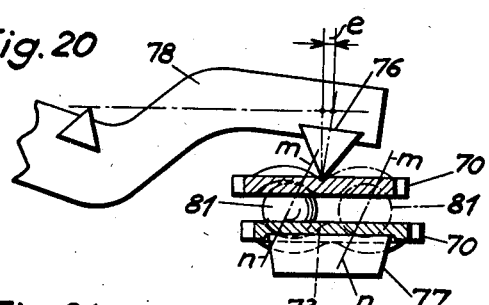
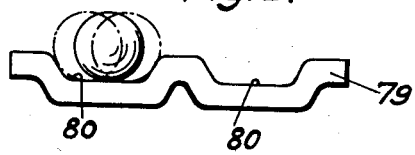

Patented May 7, 1940

2,200,141

UNITED STATES PATENT OFFICE 2,200,141

BEARINGS, ESPECIALLY FOR WEIGHING MACHINES

Armin Wirth, Zurich, Switzerland

Application February 12, 1938, Serial No. 190,313
In Germany February 25, 1937

17 Claims. (Cl. 308—2)

The invention relates to a bearing, especially for weighing machines, which comes into consideration wherever it is necessary to transmit considerable forces by means of a constructional element, requiring very little space, especially in the direction of height, through the medium of rods or levers in such a manner that only a minimum amount of friction occurs. The invention is based on the problem of providing for the known knife edge bearing and the also known ball suspension a new bearing body, for the transmission of movement or power.

According to the present invention, this is effected by a flat bearing body, which on one face is provided with cup-shaped recesses, preferably two, each adapted to receive a ball. The other face of the said body is provided with a groove for the knife edge bearing, each end of the groove is provided with an abutment surface for securing the knife edge associated with the groove in its position.

Preferably the construction is carried out in such a manner that the bearing body is circular and is provided with a narrow flat bearing rim. The bearing disc is preferably provided at its edge with recesses, with each of which there is adapted to engage a locking body or locking pin for the purpose of preventing rotation or displacement of the disc, or to keep these movements within predetermined limits.

The new bearing body may be used for the bridge suspension of weighing machines, further also as rigid lever bearing or as oscillating bearing, as a pressure link for parallel knife edges, that is to say as pressure transmitting means between two levers, further also in pressure links for crossed knife edges and finally for pendants of long or short construction.

The new bearing body may also be used in multiple arrangements, especially in association with transmission devices in which the knife edges do not extend parallel to the knife edge bearings.

The bearing body can be manufactured very easily. As it is made flat it can be formed from high valent steel solely by cold shaping.

In accordance with the present invention it is essential that one and the same element, namely the new bearing body, can also be used in connection with all hinged connections which occur in all bridge weighing machines of complicated assembly. This general possibility of application is only possible because the bearing body, according to the invention, in combination with its support or the balls serving as pressure transmission means, or pins serving for securing the position, or other elements, may have, as required, all possible degree of freedom.

Various possibilities of use of the invention are shown in the accompanying drawings, wherein Figs. 1-4 show the bearing body itself as constructed in accordance with the invention.

Fig. 1 being a section on the line 1—1 of Fig. 2.
Fig. 2 is a corresponding top plan view.
Fig. 3 is a section on the line 3—3 of Fig. 4.
Fig. 4 is an underside plan view of the bearing body constructed in accordance with the invention.

Fig. 5 is a further example of construction of the bearing body and corresponds with the illustration in Fig. 2 (top plan), the bearing body being provided with notches.

Fig. 5a shows in a plan another form of construction of the bearing body.

Fig. 6 shows the application of the bearing body of the construction according to Figs. 1-4 at A as bridge (cross) pendulum arrangement, at B as a fixed transversely moving lever bearing, at C as a pressure link, at D as a fixed non-moving lever bearing.

Fig. 7 shows the application of the bearing body in connection with a pendant of long construction.

Fig. 8 shows the application in connection with a pendant of low construction.

Fig. 9 shows the new bearing body used as a pressure link in connection with knife edges which are not parallel to one another.

Fig. 10 shows a front elevation, partly in section, of the application of the new bearing body, in connection with a bridge pendulum.

Fig. 11 shows a sectional plan on the line 11—11 of Fig. 10.

Fig. 12 shows a knife edge bearing in side elevation with a securing device using the bearing as a pressure link.

Figs. 13 and 14 show the application of the bearing as a transversely moving lever support, Fig. 13 being a vertical section and Fig. 14 a cross-section on the line 14—14 of Fig. 13.

Figs. 15 and 16 show the application as an oscillating lever bearing, Fig. 15 showing a vertical section and Fig. 16 a section on the line 16—16 of Fig. 15.

Figs. 17 to 19 show the parts of a bearing which may be used where knife edges are parallel or at right angle to each other, each part being shown in a plane.

Fig. 20 illustrates in a side elevation the operation and the errors which accrue in a bearing with the knife edges crossing.

Fig. 21 shows a ball bearing disc in a view adapted to correct the inaccuracies in bearings shown in Fig. 20.

In the flat bearing member 1 there are formed in the central part depressions 2, 3 in the form of spherical cups and located side by side and which in Figs. 2 and 5 are located on the upper side. The shape of the bearing body is preferably circular. A narrow flat rim 4 extending throughout, is formed in such a manner that the bearing member can rest by means of this edge as shown in Fig. 9 for example on a ring 62. Both the edges of the cup-shaped recesses and the back of the groove or indentation 5, 6, as will be seen in Fig. 1, are located in one plane so that this upper side of the bearing member bears securely against a flat support. On the underside of the bearing body there is provided a diametrically extending groove in which the wedge-shaped side surfaces are indicated at 5 and 6, Fig. 4. At the end of this pair of wedge surfaces 5, 6 may be provided abutment surfaces 7, 8, so as to hold the knife edge securely in the groove or wedge recesses.

Both sides of the rim 4 comprise flat annular surfaces on either of which the body may rest on a ring-like support as desired.

The grooves 2, 3, 5, 6 of the bearing member 1 are comparatively shallow.

The bearing member 1 is stamped in the cold from steel and hardened. In view of the substantially flat shape and the comparatively slight deformation, reduction of hardness is not anticipated.

In the example of construction in Fig. 5 which is similar to that shown in Fig. 2, circular notches 9 are provided so as to allow means such as bolts, pins, etc. for preventing rotation to act on the disc-shaped bearing member 1.

Fig. 5a shows polygonal shaped recess to receive the locking pins serving as abutments for the disc and preventing rotation thereof.

In Fig. 5 there is shown in chain-dotted lines, a frame 10, 35 engaging with two oppositely disposed recesses 9, this frame being shown in greater detail in Fig. 8.

In the example of construction in Fig. 6, 11 is the platform of the weighing machine, 12 is the weighing beam and 13 a transmitting lever, 14 is the base plate of the weighing machine. The platform 11 is connected by a support 15 to a fitting 16 into which there is fitted the bearing member 1 constructed in accordance with the invention. The set of balls is indicated at 17. A further bearing member 1, of which the knife edge grooves are directed downwardly and which rests on a knife edge 8, is arranged exactly in the reverse manner to the first bearing member. In this manner and by these means the bearing body constructed in accordance with the invention is utilised at A in Fig. 6 for the bridge oscillating movement of a weighing machine.

The weighing beam 12 carries at the middle thereof a knife edge 19. With this knife edge there is associated a bearing member 1, constructed in accordance with the invention, in such a position that the knife edge 19 is capable of engaging with the groove from the top, whilst underneath two short supporting bolts 20 engages with the spherical cup-shaped recesses of the bearing member 1 instead of two balls. The two bolts 20 are carried by a support 21 which is connected to the base plate 14 of the entire weighing machine. In this manner the bearing member constructed in accordance with the invention, is utilised at B in Fig. 6 as a lever support for the bearing of a weighing machine.

In addition to the bearings as at A as a bridge pendulum or at B as a lever support there is used in the weighing machine in Fig. 6 a connection of the levers 12 and 13 in the form of a pressure link at C. The lever 13 carries at its free end a knife edge 22 relatively to which the bearing member 1 is so arranged that the knife edge is capable of engaging with the groove.

With the upper bearing member 1 is associated, with the interposition of a row of balls 17, a similar but reversely arranged bearing member 1, of which the groove located on its under side is engaged by a knife edge 23 which in turn is carried by the end of the weighing beam 12. In addition there is shown at the right hand end of Fig. 6 at D a fixed non-moving lever bearing. The bearing member 1 rests on a flat plate supported by two supports 25, the downwardly directed groove in the member being engaged by the knife edge 26 of the lever 13.

Fig. 6 shows as a whole a simple construction of a weigh bridge which is very low in height and which it is only possible to obtain by the use of the bearing members in accordance with the invention.

In Fig. 7 which shows the application of the new bearing member in connection with a pendant of some length 27 is the end of a lever, only shown partly, into which is fitted the upwardly pointing knife edge 28. On the bearing member 1 there are supported in cup-shaped recesses 2, pressure bolts 63 which project from a strap shaped member 29 of which the downwardly bent portion is curved inwardly and terminates in the eye 30 for the reception of a pendant 31.

In the example of construction shown in Fig. 8 there is shown the application of the new bearing member or of the new bearing in connection with a pendant which is low in height. Into the end of a lever 32 is fitted a knife edge 33 on which rests the bearing member 1 in the cup-shaped recesses of which there are supported projections 34 of a frame 10, 35 (Figs. 5 and 8). A further lever 36 carries a knife edge 37 which engages with the groove of a bearing member 1, constructed in accordance with the invention, which in a similar manner to the upper bearing member 1 is supported on the common frame 10.

Fig. 9 shows an example of construction in which the knife edges do not extend parallel but are arranged crosswise. 39 is a weighing beam of which the knife edge is indicated at 40. The knife edge rests in the groove of the member 1. The bearing member 1 bears through the medium of a ring 62 upon a further bearing member 1, by which it is supported, this further bearing member 1 having its spherical cup-shaped recesses associated with a set of balls 17, and below this second bearing member there is located a further bearing member 1 with the downwardly directed groove with which there engages a knife edge 41. The two knife edges 41 and 40 can be arranged at any suitable angle relatively to one another. In the example of construction shown, this angle is 90°.

In the example of construction in Figs. 10 and 11 which relate to a bridge pendulum bearing, 42 is the bridge support against the flat lower surface of which there bears a bearing member 1 which in its downwardly directed spherical cup-shaped recesses receives two balls 17 which engage with the recesses of a second bearing member 1 which is arranged reversely to the first bearing member 1. The downwardly directed groove of the lower bearing member 1 is engaged by a knife edge 43. In order to secure the composite bearing system, formed of the two bearing members constructed in accordance with the invention, the knife edge and the ball system, in position, there is used in the construction in Figs. 10 and 11 a construction of bearing member according to Fig. 5, wherein the bearing member 1 is provided for example with semi-circular notches 9. The semi-circular notches 9 engage with securing bolts 44 which are screwed into the part 42. The bolts 44 are of somewhat larger diameter at the upper portion 45 thereof which is adjacent the screwthreaded portion so that they fit into the recess 9 in the illustration according to Fig. 5 or 5a, whilst the lower bearing member, constructed in accordance with the invention, has the same recesses 9, but with these recesses there engage the shaft portion 44 of the bolt which is of substantially smaller diameter. The bolts 44 thus secure the exact position of the upper bearing body 1 and prevent together with the head of the bolts 44, the lower bearing member 1 from falling out but permit of slight rocking movement in all directions.

The whole arrangement according to Fig. 10 could be used as a rocking lever bearing instead of the arrangement D in Fig. 6.

In the form of construction in Fig. 12 there is also provided a securing device for the bearing member, constructed in accordance with the invention, in connection with a pressure couple. According to this arrangement the two bearing members 1, having their cup-shaped recesses turned towards one another and carrying between them the two balls 17, are fitted loosely between the knife edge 46 of the lever 47 and the knife edge 48 of a second lever, not shown.

The two bearing members 1 are again provided with recesses 9 by means of which they freely engage with the shafts 49 of the two screw bolts 50 having heads 51. The shaft 49 is of such a length and of such a diameter that it permits of free movement of the two bearing members 1 but prevents these from slipping off.

Figs. 13 and 14 show the application of the bearing member, constructed in accordance with the invention, as a lever bearing having freedom of movement in the transverse direction. The bearing member 1 is again constructed in accordance with the construction in Fig. 5 or 5a and is provided with four recesses 9. With these recesses 9 are associated bolts 52 which engage with clearance in corresponding bores 53 of the weighing beam 54. Into the weighing beam is fitted a knife edge 55 which engages with the groove of the bearing member 1. The cup-shaped recesses on the under side are supported on the stationary pressure pins 56 of the member 57. The bolts 52 are provided with a comparatively small diameter relatively to the recesses 9. The bearing member 1 is thus held immovably rectilinearly relatively to the direction D—E. However it is capable of turning through a predetermined angular amount in the direction of the arrow F about the centre G. It thus always adjusts itself automatically in the plane of the knife edge in the correct position relatively to the knife edge 55, and it is very essential that the bearing member 1 rests only on the two pressure bodies 56 so that the bearing member can also adjust itself freely in the plane of the knife edge. Further a slight possibility of adjustment is provided for in the direction H—J, but this is large enough so as to equalise inaccuracies in production which may have occurred. The two bolts 52 may form by means of the bores 53 a security of the lever 54 against slipping off.

The arrangement in Figs. 13 and 14 consequently shows relatively to the self-adjustment 2 to 3 degrees of freedom of movement for the new bearing member.

Figs. 15 and 16 show in connection with a rocking lever bearing another type of device for securing the bearing member constructed in accordance with the invention. For the upper bearing member 1 a possibility of securing is indicated by two pins 61 (Fig. 16). The ball side of the upper bearing member 1 bears against two balls 17 which in turn are supported by a bearing member which is arranged in the reverse manner to the first bearing member. The lower bearing member, supported on the weighing machine part 60 is sufficiently secured against displacement by two diametrically oppositely disposed pins 61.

Figs. 15 and 16 also show that for the upper bearing member 1 there are provided four degrees of freedom of movement as the bearing member 1 can move freely with the lever 59 resting thereon in both directions in the plane of the balls. Further, by turning in the plane of the balls it swings into the correct position relatively to the knife edge 58. Also by tilting about the balls it adjusts itself with its notch in the plane of the knife edge. The same conditions also apply to the example of construction in Figs. 10 and 11.

The number of degrees of freedom of movement when used as a pressure couple and as pendant is again different.

Further, the four recesses 9 are of importance in the application in all possible cases. These recesses serve as shown in the separate figures, either for the accurate or approximate adjustment of the position of the bearing member or as a security against slipping off or disengagement of the parts or for both purposes simultaneously.

In Fig. 17 a bearing disc 70 is shown having four depressions 71 to 74, each adapted to receive a ball 81. The depressions have the same radial distance and are the same distance apart. The disc 70 is moreover provided with a groove 75 to receive the knife edge of a lever etc. Two of such superposed discs 70 and two balls between them might be used to form a bearing in which the knife edges 76, 77 of two parts interconnected by said bearing (such as for instance is shown in Fig. 12) run parallel to each other, Fig. 18, or at right angles as shown in Figs. 19 and 20. If the deflection of the lever 78 is great the two superposed discs 70 are displaced with reference to each other, say for an amount equal to e (Fig. 20). The weight is transmitted in the direction of the lines m—n. The leverage is altered and an inaccuracy accrues. The latter may be obviated if the disc 79 is provided not with cup-shaped depressions but with flat races 80 (Fig. 21). The balls 81 are free to run on the races 80 within certain limits.

The possibility of application of the new bearing member can be subdivided as follows:

1. A bearing member.
The bearing member is located between
    a. A plane and knife edge. Application as fixed bearing for levers.
    b. Two points and a knife edge. Application for a transversely moving bearing for levers, as pendants of short (Fig. 8) and long construction (Fig. 7).

2. Two bearing members with two balls.
   a. Two knife edges. Application as pressure couple between two levers.
   b. A plane and knife edge. Application as bridge pendulum or rocking lever bearing.

3. Three bearing members with two balls.
   Application as pressure couple between suitable crossing knife edges (see Fig. 9).

4. Two bearing members with a frame.
   As double (crossing pendulum) pendant preferably of short construction with preferably parallel knife edges.

5. A bearing member with a strap.
   Used separately or in pairs for pendants of suitable length and for suitably crossed knife edges.

What I wish to claim and secure by U. S. Letters Patent:

1. A bearing member, especially for weighing machines, comprising a relatively thin metal disc, one side of said disc being provided with cup-shaped recesses for the reception of pressure bodies, for example balls, the other side of said disc being provided with a groove for the reception of a knife edge of the weighing machine, the radii of curvature of said recesses being appreciably greater than that of said pressure bodies.

2. A bearing member according to claim 1, wherein the disc has a flat surface on each opposite face and adjacent the periphery of the disc, the flat surface on one face being parallel to that on the other face.

3. A bearing member according to claim 1, wherein said bearing member is provided with peripheral recesses, said peripheral recesses being adapted for the purpose of enabling the bearing member to be secured in position.

4. A pressure couple bearing for weighing machines comprising a pair of discs, each of said discs having cup-shaped recesses in one of its faces and a groove in the other face of said disc, the faces with the cup-shaped recesses being turned towards each other and knife edges engaging with the grooves in the outer faces of said discs.

5. Bearing for weighing machines, comprising a pair of discs, said discs each having on one face thereof a cup-shaped recess and on the other face a groove, the faces with the cup-shaped recesses being turned towards one another, balls mounted in said cup-shaped recesses, said discs having peripheral recesses therein, and stationary bolts engaging said peripheral recesses.

6. Bearing for weighing machines, comprising a pair of discs each provided on one face with spherical recesses and on the other face with a groove and having peripheral recesses therein, the surfaces of the cup-shaped recesses being turned towards one another, balls located in said cup-shaped recesses, knife edges engaging said grooves, bolts engaging said peripheral recesses, said bolts fitting loosely into said peripheral recesses and heads on said bolts, the arrangement being such as to permit relative movement between said discs, whilst limiting relative movement between said discs.

7. A bearing structure for a weighing mechanism comprising means for connecting levers of the weighing mechanism with each other by means of knife edges and knife edge bearing members, said knife edge bearing members each comprising a disk having a knife edge receiving groove in one face formed by inclined longitudinal plane-surface walls meeting along one longitudinal edge and end walls, the other side of said disk being provided with ball receiving recesses, the recesses being at least two in number, one lying at one side of a plane normal to the disk and passing through said meeting edges of said plane-surface walls and the other recesses lying at the other side of the same.

8. A bearing structure for a weighing mechanism comprising means for connecting levers of the weighing mechanism with each other by means of knife edges and knife edge bearing members, said knife edge bearing members each comprising a disk having a knife edge receiving groove in one face formed by inclined longitudinal plane-surface walls meeting along one longitudinal edge and end walls, the other side of said disk being provided with ball receiving recesses, the recesses being at least two in number, one lying at one side of a plane normal to the disk and passing through said meeting edges of said plane-surface walls and the other recesses lying at the other side of the same, said disk having a marginal portion provided with plane surfaces on opposite sides of the disk defining resting surfaces.

9. A bearing structure for a weighing mechanism comprising means for connecting levers of the weighing mechanism with each other by means of knife edges and knife edge bearing members, said knife edge bearing members each comprising a disk having a knife edge receiving groove in one face formed by inclined longitudinal plane-surface walls meeting along one longitudinal edge and end walls, the other side of said disk being provided with ball receiving recesses, the recesses being at least two in number, one lying at one side of a plane normal to the disk and passing through said meeting edges of said plane-surface walls and the other recesses lying at the other side of the same, the end walls of said groove being equally spaced from a plane passing through the center of said depressions and extending normally to the plane of the disk.

10. A bearing structure for a weighing mechanism comprising means for connecting levers of the weighing mechanism with each other by means of knife edges and knife edge bearing members, said knife edge bearing members each comprising a disk having a knife edge receiving groove in one face formed by inclined longitudinal plane-surface walls meeting along one longitudinal edge and end walls, the other side of said disk being provided with ball receiving recesses, the recesses being at least two in number, one lying at one side of a plane normal to the disk and passing through said meeting edges of said plane-surface walls and the other recesses lying at the other side of the same, said disks each having marginal recesses for the reception of means to hold the disks against rotation.

11. A bearing structure for a weighing mechanism comprising means for connecting levers of the weighing mechanism with each other by means of knife edges and knife edge bearing members, said knife edge bearing members each comprising a disk having a knife edge receiving groove in one face formed by inclined longitudinal plane-surface walls meeting along one longitudinal edge and end walls, the other side of said disk being provided with ball receiving recesses, the recesses being at least two in number, one lying at one side of the plane normal to the disk and passing through said meeting edges of said plane-surface walls and the other recesses lying at the other side of the same, said disks having marginal recesses and pins located in said recess for limiting movement of the disks in their own planes.

12. A bearing structure for a weighing mechanism comprising means for connecting levers of the weighing mechanism with each other by means of knife edges and knife edge bearing members, said knife edge bearing members each comprising a disk of relatively thin metal of substantially uniform gauge throughout and having a knife edge receiving groove in one face formed by inclined longitudinal plane-surface walls meeting along one longitudinal edge and end walls, the other side of said disk being provided with ball receiving recesses, the recesses being at least two in number, one lying at one side of a plane normal to the disk and passing through said meeting edges of said plane-surface walls and the other recesses lying at the other side of the same, said disk having a marginal portion provided with a plane surface defining a resting surface.

13. A bearing structure for a weighing mechanism comprising means for connecting levers of the weighing mechanism with each other by means of knife edges and knife edge bearing members, said knife edge bearing members each comprising a disk of relatively thin metal of substantially uniform gauge throughout and having a knife edge receiving groove in one face formed by inclined longitudinal plane-surface walls meeting along one longitudinal edge and end walls, the other side of said disk being provided with ball receiving recesses, the recesses being at least two in number, one lying at one side of a plane normal to the disk and passing through said meeting edges of said plane-surface walls and the other recesses lying at the other side of the same, the end walls of said groove being equally spaced from a plane passing through the center of said depressions and extending normally to the plane of the disk.

14. A bearing structure for a weighing mechanism comprising means for connecting levers of the weighing mechanism with each other by means of knife edges and knife edge bearing members, said knife edge bearing members each comprising a disk of relatively thin metal of substantially uniform gauge throughout and having a knife edge receiving groove in one face formed by inclined longitudinal plane-surface walls meeting along one longitudinal edge and end walls, the other side of said disk being provided with ball receiving recesses, the recesses being at least two in number, one recess lying at one side of a plane which is normal to the center of the disk and another recess lying at the other side of the same, said disks each having marginal recesses for the reception of means to hold the disks against rotation.

15. A bearing structure for a weighing mechanism comprising means for connecting levers of the weighing mechanism with each other by means of knife edges and knife edge bearing members, said knife edge bearing members each comprising a disk of relatively thin metal of substantially uniform gauge throughout and having a knife edge receiving groove in one face formed by inclined longitudinal plane-surface walls meeting along one longitudinal edge and end walls, the other side of said disk being provided with ball receiving recesses, the recesses being at least two in number, one recess lying at one side of the plane which is normal to the center of the disk and another recess lying at the other side of the same, said disks having marginal recesses and pins located in said recess for limiting movement of the disks in their own planes.

16. A bearing disk of relatively thin metal of substantially uniform gauge throughout and having on each face a flat annular bearing surface adjacent the periphery of the disk, said surfaces being parallel to one another, one face of said disk having a groove for a knife edge, said groove lying along a diameter of the disk, the other face of said disk having concave ball-receiving recesses located at opposite sides of said diameter, said groove and said recesses being confined within the inner bounds of said annular bearing surfaces.

17. A bearing disk of relatively thin metal of substantially uniform gauge throughout and having on each face a flat annular bearing surface adjacent the periphery of the disk, said surfaces being parallel to one another, one face of said disk having a groove for a knife edge, said groove lying along a diameter of the disk, the other face of said disk having concave ball-receiving recesses located at opposite sides of said diameter, said groove and said recesses being confined within the inner bounds of said annular bearing surfaces, said metal being cold pressed steel.

ARMIN WIRTH.